US 6,577,826 B1

(12) United States Patent
Misaizu et al.

(10) Patent No.: US 6,577,826 B1
(45) Date of Patent: Jun. 10, 2003

(54) IMAGE FORMING APPARATUS WHICH SETS PARAMETERS FOR THE FORMATION OF PAPER

(75) Inventors: Toru Misaizu, Kanagawa (JP); Atsushi Kitagawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/721,619

(22) Filed: Nov. 27, 2000

(30) Foreign Application Priority Data

Mar. 24, 2000 (JP) ..................................... 2000-085085

(51) Int. Cl.[7] .............................................. G03G 15/00
(52) U.S. Cl. .............................. 399/45; 399/50; 399/51; 399/53; 399/66; 399/67
(58) Field of Search ............................... 399/38, 39, 42, 399/44, 45, 47, 48, 49, 50, 51, 53, 55, 66, 67, 69, 23, 11; 358/518, 519, 521, 523, 529, 530; 428/404.4

(56) References Cited

U.S. PATENT DOCUMENTS

| | | | | |
|---|---|---|---|---|
| 5,662,995 A | * | 9/1997 | Sakurai et al. ............ | 428/404.4 |
| 5,809,367 A | * | 9/1998 | Yoo et al. ...................... | 399/45 |
| 5,956,543 A | * | 9/1999 | Aslam et al. .................. | 399/45 |
| 6,091,520 A | * | 7/2000 | Hibi et al. ................... | 358/530 |
| 6,157,791 A | * | 12/2000 | Haines et al. .................. | 399/23 |
| 6,219,498 B1 | * | 4/2001 | Katoh et al. .................. | 399/45 |
| 6,236,815 B1 | * | 5/2001 | Kaneko et al. ................ | 399/45 |
| 6,253,041 B1 | * | 6/2001 | Tomizawa et al. ............ | 399/66 |
| 6,336,007 B1 | * | 1/2002 | Sugisaki et al. ............... | 399/11 |

FOREIGN PATENT DOCUMENTS

| | | |
|---|---|---|
| JP | 4-39223 | 2/1992 |
| JP | 5-104754 | 4/1993 |
| JP | 9-69960 | 3/1997 |
| JP | 10-55085 | 2/1998 |

* cited by examiner

Primary Examiner—Hoan Tran
(74) Attorney, Agent, or Firm—Morgan, Lewis & Bockius LLP

(57) ABSTRACT

In an image forming apparatus, in accordance with formation of paper, there are controlled parameters; that is, a color conversion parameter pertaining to a color conversion section 23 of a drawing section 22; a parameter pertaining to a correction curve of an TRC-γ correction section 24 or a parameter pertaining to the number of screens or a growth pattern of a screen processing section 25 provided in a printer engine control section 12; parameters for use in adjusting electrification, exposure, and a voltage to be used during a developing operation, which are employed in a printer engine 13; a parameter for adjusting a voltage or current during a transfer operation; and a parameter for adjusting a fixing temperature or pressure. Parameters are controlled so as to reduce inconsistencies, which would otherwise arise in paper of poor formation. Thus, picture quality of an image is improved while inconsistencies are made less noticeable.

24 Claims, 14 Drawing Sheets

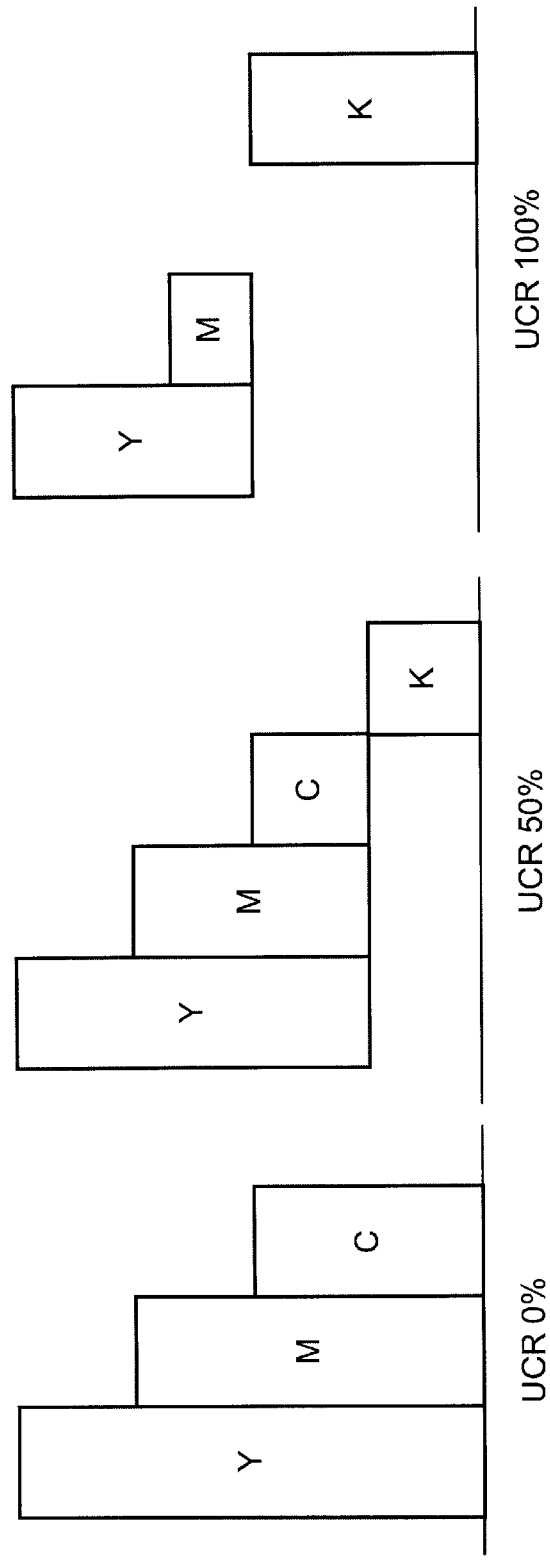

| 241~248 | 204~210 | 176~182 | 148~154 | 120~126 | 233~240 |
|---|---|---|---|---|---|
| 127~133 | 99~105 | 64~70 | 36~42 | 92~98 | 218~224 |
| 155~161 | 43~49 | 15~21 | 22~28 | 78~84 | 190~196 |
| 183~189 | 71~77 | 0~7 | 8~14 | 50~56 | 162~168 |
| 211~217 | 85~91 | 29~35 | 57~63 | 106~112 | 134~140 |
| 225~232 | 113~119 | 141~147 | 169~175 | 197~203 | 249~255 |

FIG. 6A ←→ FIXER

| 192~207 | 64~79 | 80~95 | 208~223 |
|---|---|---|---|
| 160~175 | 32~47 | 48~63 | 176~191 |
| 128~143 | 0~15 | 16~31 | 144~159 |
| 224~239 | 96~111 | 112~127 | 240~255 |

FIG. 6B

| 143~171 | 29~57 | 172~200 |
|---|---|---|
| 85~113 | 0~28 | 114~142 |
| 201~229 | 56~84 | 230~255 |

FIG. 6C

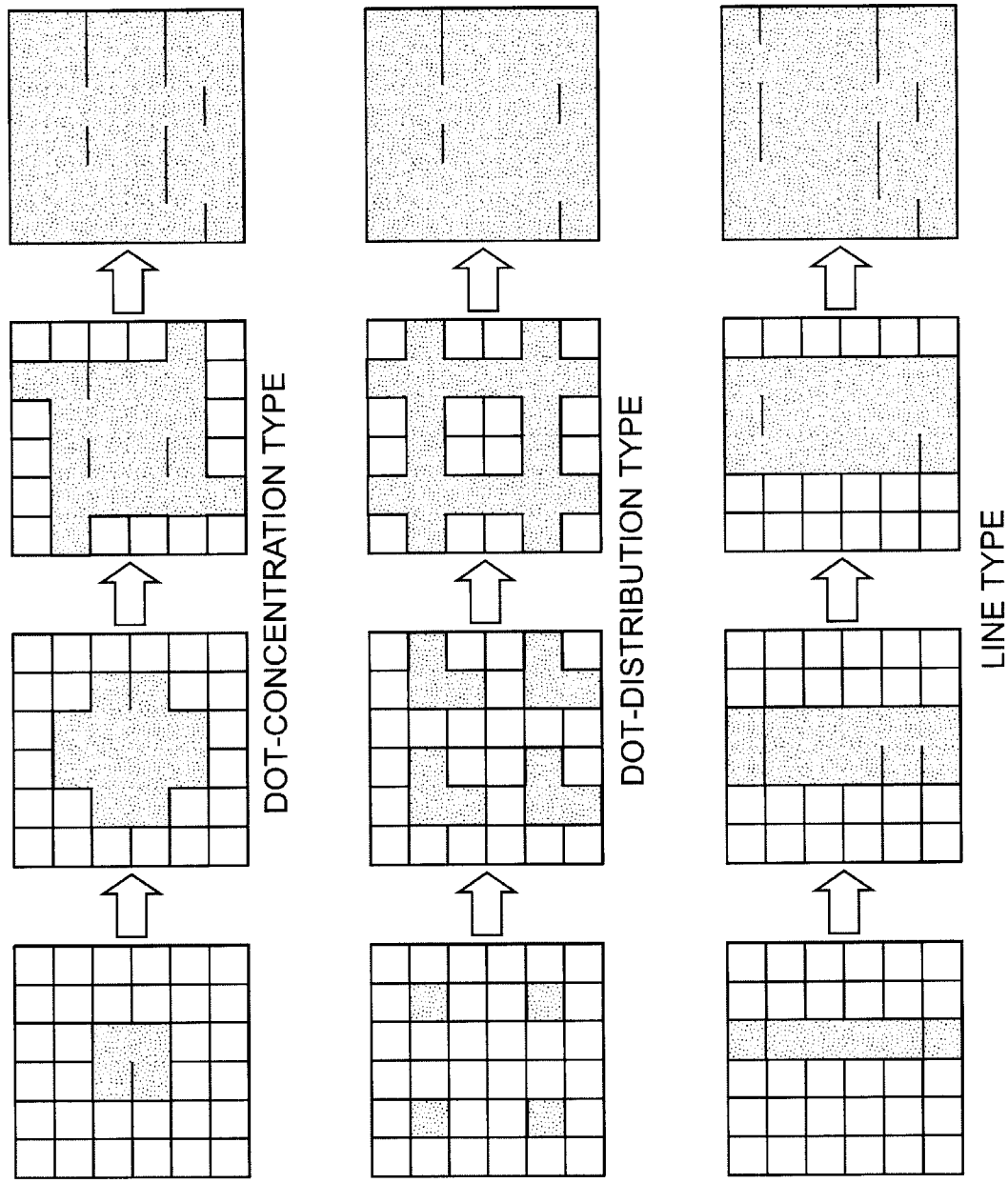

| CATEGORY | A | B | C |
|---|---|---|---|
| FORMATION INDEX | ~10 | 10~20 | 20~ |
| UCR | 0~50% | 50~100% | 50~100 |
| TRCg | 1.2~ | 1.0~1.2 | 1.0 |
| SCREEN (OTHER THAN TEXT PORTION) | 70~110 LINES | 110~160 LINES | 160~220 LINES |
| FIXING TEMP. | LOW | INTERMEDIATE | INTERMEDIATE |

FIG. 16

| CATEGORY | A | B | C |
|---|---|---|---|
| FORMATION INDEX | ~10 | 10~20 | 20~ |
| SWITCHED | X | O_ | ◎ |
| NOT SWITCHED | O | O+ | ◎ |

FIG. 17

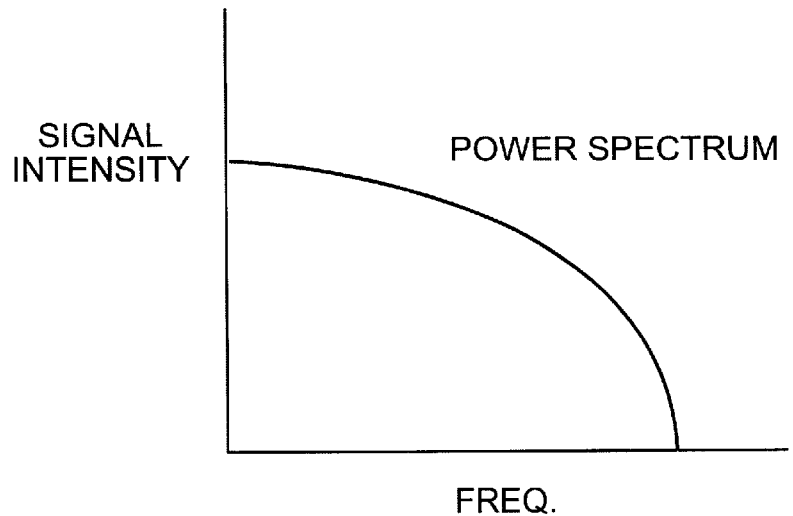
FIG. 19A
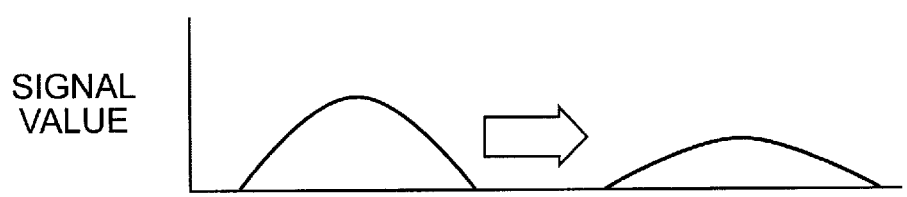
FIG. 19B
FIG. 19C

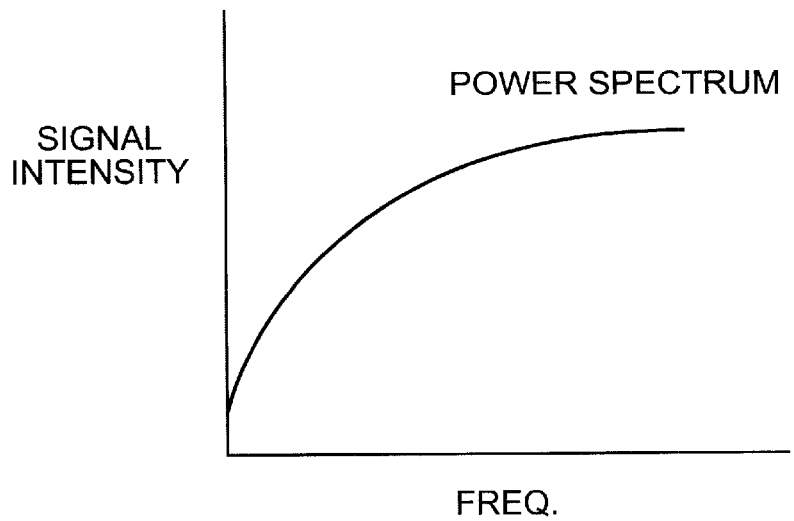
FIG. 20A
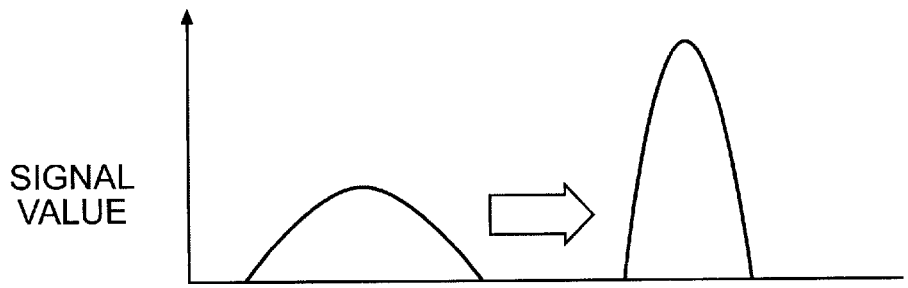
FIG. 20B
FIG. 20C

IMAGE FORMING APPARATUS WHICH SETS PARAMETERS FOR THE FORMATION OF PAPER

BACKGROUND OF THE INVENTION

1. Field of the Invention

The present invention relates to an image forming apparatus for forming an image on paper.

2. Description of the Related Art

Individual sections of a color copier or printer have hitherto been optimized for attaining the best picture quality on specialized paper. For this reason, satisfactory picture quality can be attained at the time of use of specialized paper. However, in many cases satisfactory picture quality cannot be attained through use of paper other than specialized paper, such as plain paper or recycled paper. Particularly, when an image is formed on foreign-made coarse paper, inconsistencies in picture quality arise, whereas minimum inconsistencies in picture quality arise when an image is formed on specialized paper. The degree of inconsistency in picture quality becomes more noticeable in the following sequence: Japanese-made plain paper, Japanese-made recycled paper, and foreign-made plain paper.

For instance, in a case where an electrophotographic method is used as an image formation method, random inconsistencies (such as inconsistencies in gloss or fixing inconsistencies) arise in an image for reasons of inconsistencies in the fineness of paper when toner is fixed on paper. The random inconsistencies become more noticeable in a halftone area than in a solid-toned area having a high pile height.

A conceivable method of improving inconsistencies is described in, for example, Japanese Patent Application Laid-Open No. 104754/1993. In an ink-jet recording method for squirting ink by means of an electric field, picture quality is improved by means of changing an applied voltage, to thereby control ink dots at the time of formation of an image on paper having a low degree of smoothness. In a real situation, however, picture quality is not improved, for reasons of smearing.

Japanese Patent Application Laid-Open NO. 55085/1998 describes an electrophotographic method, wherein an image is smoothed through use of transparent toner, thereby attaining high picture quality. However, use of transparent toner adds to the cost of an ordinary office printer and operating costs thereof. Thus, the method is not acceptable.

Japanese Patent Application Laid-Open No. 69960/1997 describes a method in which color transformation operation is performed according to the type of paper, such as plain paper or woodfree paper, thereby improving color reproduction. According to this invention, the type of paper is identified by means of an identification mark affixed on paper, surface reflectivity, or surface roughness. The surface reflectivity of paper indicates the brightness of paper. Similarly, according to a method described in, for example, Japanese Patent Application Laid-Open No. 39223/1992, the reflectivity of paper is determined by the steps of: radiating light onto paper, and measuring light reflected from the paper through use of a sensor, to thereby determine the degree of brightness.

Thus, attention has hitherto been paid to the characteristics of paper, such as brightness and smoothness (i.e., surface roughness), to thereby identify the type of paper. An image is formed in a manner corresponding to the type of paper. Even in a case where image production parameters are changed according to the type of paper, the previously-described inconsistencies sometimes arise even when paper of the same type is used for printing.

SUMMARY OF THE INVENTION

The present invention has been conceived in view of the drawbacks of the background art and is aimed at providing an image forming apparatus capable of forming an inconsistency-free image of good picture quality.

According to the present invention, there is provided an image forming apparatus characterized in that an image is formed on paper by means of setting parameters to image formation means according to the formation of paper on which an image is to be formed. As used herein, "formation of paper relates to the composition and texture of paper." As has been mentioned previously, brightness or smoothness has hitherto been used as a typical characteristic value of paper pertaining to picture quality. Subjective evaluation of the relationship between brightness, smoothness, and picture quality has been tested. Test results are converted into numerals; that is, sensory scores, and the coefficients of correlation are determined from the sensor scores. The coefficient of correlation between brightness and picture quality assumes a value of 0.53. The coefficient of correlation between smoothness and picture quality assumes a value of 0.59. Similarly, the coefficient of correlation between a formation index indicating the formation of paper and picture quality was determined through a test. The coefficient of correlation between formation and picture quality assumes a value of 0.80. It can be said that the correlation between formation and picture quality is most strong. For this reason, the present invention pays attention, as a characteristic factor of paper, to formation having a high correlation with picture quality. Parameters are set in accordance with a formation index. As a result, inconsistencies appearing in a formed image are diminished, thereby improving picture quality.

As examples of the parameters to be set in accordance with the formation of paper, there can be set: for example, a color correction parameter to be used for a color correction operation; a parameter for controlling the amount of black coloring material at the time of removal of base color and at the time of production of a black plate; a spatial filtering operation parameter; a γ correction operation parameter; and a parameter for instructing the number of screens used for screen processing or a growth pattern. In a case where an image is formed through use of the electrophotographic method, parameters for controlling voltages used for electrification, exposure, and development, a parameter for controlling a voltage or current to be used for transfer of an image, and a parameter for controlling temperatures or pressure at the time of an fixing operation can be set in accordance with the formation of paper.

An image forming apparatus can be configured so that a user can set the formation of paper from operation means or remotely by way of external interface means. Alternatively, the formation of paper can be automatically detected through use of sensor means.

BRIEF DESCRIPTION OF THE DRAWINGS

FIGS. 4A to 4C are descriptive views showing examples of undercover removal (UCR) operation;

FIGS. 6A through 6C are charts for describing examples of dithering matrices used in screen processing sections;

FIGS. 7A through 7C are illustrations for describing examples of screen growth patterns;

FIG. 16 is a table showing specific examples of categories into which paper is classified according to formation and parameter settings assigned to respective categories;

FIG. 17 is a table showing an example of effects exerted on picture quality when parameters are controlled according to the categorized formation of paper and effects exerted on picture quality when parameters are not controlled according to the categorized formation of paper;

FIGS. 19A through 19C are descriptive views showing an example of a smoothing filter characteristic of a space filtering section; and FIGS. 20A through 20C are descriptive views showing an example of an enhancement filter characteristic of the space filtering section.

DETAILED DESCRIPTION OF THE PREFERRED EMBODIMENTS

Figure 1:
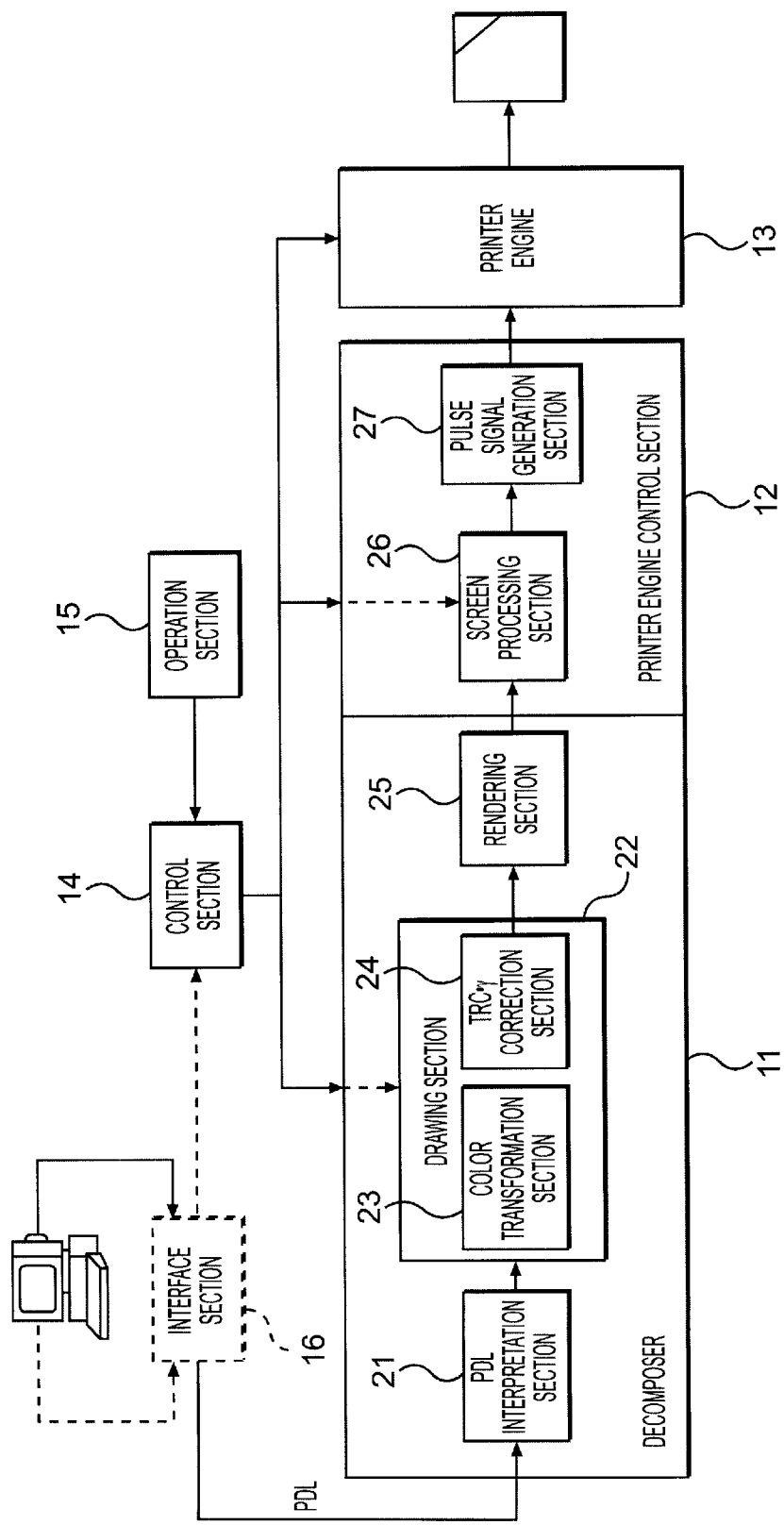
FIG. 1 is a block diagram showing an image forming apparatus according to an embodiment of the present invention.

FIG. 1 is a block diagram showing an image forming apparatus according to a first embodiment of the present invention. In the drawing, reference numeral 11 designates a decomposer; 12 designates a printer engine control section; 13 designates a printer engine; 14 designates a control section; 15 designates an operation section; 16 designates an interface section; 21 designates a PDL interpretation section; 22 designates a drawing section; 23 designates a color transformation section; 24 designates a TRC·γ correction section; 25 designates a rendering section; 26 designates a screen processing section; and 27 designates a pulse signal generation section. This embodiment shows the image forming apparatus configured so as to draw an image in accordance with drawing data which are described in page-description language (PDL) and are transmitted from an external computer, as well as to form the thus-drawn image on paper.

The decomposer 11 performs a drawing operation in accordance with drawing data which are transmitted from a computer directly or by way of a network and are described in PDL. The decomposer 11 contains the PDL interpretation section 21, the drawing section 22, and the rendering section 25. The PDL interpretation section 21 interprets the drawing data described in PDL and performs control operations in accordance with various commands.

In accordance with interpretation of drawing data performed by the PDL interpretation section 21, the drawing section 22 produces an intermediate code for drawing purpose. The drawing section 22 includes the color transformation section 23 and the TRC·γ correction section 24. The color transformation section 23 transforms drawing colors [e.g., colors of a color space specified by Red, Green and Blue (hereinafter called simply "RGB space")] specified by the drawing data described in PDL into colors to be used by the printer engine 13 [e.g., colors of a color space specified by YMCK (hereinafter simply called "YMCK space")]. The color transformation section 23 can be constituted of, for example, a three-dimensional lookup table (hereinafter referred to as "DLUT") or a matrix operation using a transformation matrix. The TRC·γ correction section 24 performs a halftone correction operation for outputting a signal to the printer engine 13 in accordance with a tone reproduction curve (TRC) and a γ value which is a coefficient representing the extent of the input/output correction by the γ function. The TRC·γ correction section 24 can be constituted of, for example, a one-dimensional lookup table (LUT).

The rendering section 25 produces image data for one page suitable for use with the printer engine 13, through a rendering operation and on the basis of the intermediate code produced by the rendering section 22. Here, the image data are produced so as to comply with a drawing resolution of the printer engine 13. In a case where image data are supplied from the outside, the rendering section 25 or the drawing section 22 performs transformation of resolution.

The printer engine control section 12 converts the image data output from the decomposer 11 into an electronic signal and outputs the electronic signal to the printer engine 13 so that the printer engine 13 can form an image. The printer engine control section 12 has the screen processing section 26 and the pulse signal generation section 27. The screen processing section 26 subjects the image data output from the decomposer 11 to screen processing, in accordance with the specified number of screens and a growth pattern. The screen processing to be performed by the screen processing section 26 may be performed by the drawing section 22 by means of load distribution.

The pulse signal generation section 27 converts the image data, which have been subjected to screen processing in the screen processing section 26, into a pulse signal to be used for activating the printer engine 13. The printer engine control section 12 corresponds to the printer engine 13.

The printer engine 13 forms an image on paper in accordance with a drive signal output from the printer engine control section 12; for example, a pulse signal. The following description is based on a case where the electrophotographic method is used as an image formation method. However, the present invention is not limited to such a method; for example, the present invention can be used in conjunction with an arbitrary image formation method, such as an ink-jet image formation method, a thermal-transfer image formation method, a heat-sensitive recording method, or a dot-impact image formation method.

The control section 14 forms an image on paper in accordance with the drawing data described in PDL, by means of controlling the overall image forming apparatus. Particularly, the control section 14 controls parameters to be sent to the drawing section 22, the screen processing section 26, and the printer engine 13, in accordance with the formation index of paper on which the printer engine 13 is to produce an image, thereby enabling formation of an optimum image complying with the formation of paper. The image forming apparatus can be constructed such that the user can specify formation of paper by way of the operation section 15, such that formation of paper can be specified by an unillustrated sensor for detecting formation of paper, or such that formation of paper can be specified remotely by a computer by way of the interface section 16. Details of parameter setting will be described later.

The operation section 15 enables setting of the image forming apparatus or display of states of the image forming apparatus. Particularly, in the present example, formation of paper to be used for formation of an image can be set. As a matter of course, the type of paper, such as woodfree paper, plain paper, or recycled paper, can be set. Even in the case of single plain paper, there can be performed settings; that is, designation of paper having poor formation or designation of paper having good formation. Naturally, there can be performed direct designation of a formation index or setting of a formation index from indices which have been categorized to a certain extent.

The interface section 16 receives information from an external computer. The interface section 16 receives drawing data which are described in PDL and sent from an external computer, and passes the drawing data to the decomposer 11. Further, the printer engine 13 enables instruction of formation of paper to be used for forming an image. In such a case, information about the formation of instructed paper is delivered to the control section 14.

Next will be described in more detail individual sections of the control section 14 which controls parameters in accordance with the formation of paper. Formation of paper and the basic control policy will be first described. As mentioned previously, the quality of formation of paper affects occurrence of in consistencies. In a case where paper possesses poor formation, so long as a decrease in picture quality can be compensated for, control involving a decrease in picture quality is preferably performed. More specifically, parameters are controlled to reduce inconsistencies such that the picture quality of the overall image is improved. For example, in the case of use of an electrophotographic printer engine using toner as a coloring material and use of paper of poor formation, parameters are controlled to increase the amount of toner such that paper becomes completely invisible through toner, thus preventing appearance of the formation of paper in picture quality. In this case, an increase in the amount of toner to be used involves deterioration of picture quality. However, if the improvement in picture quality attained by means of controlling parameters exceeds the deterioration of picture quality caused by use of more toner, the change in the amount of toner is preferable. The same applies to the case of use of a coloring material other than toner.

There will now be described control of parameters performed by the drawing section 22 in accordance with formation of paper. Particularly, the drawing section 22 can control parameters pertaining to the color transformation section 23 and the TRC·γ correction 24.

As mentioned above, the color transformation section 23 transforms a drawing color (e.g., a color defined in RGB space) specified by the drawing data described in PDL into a color to be used by the printer engine 13 (e.g., a color defined in YMCK space). Transformation of RGB space into YMCK space can be implemented as follows:

γ transformation of RGB space to standard RGB space is arbitrarily performed through use of a desired display. More specifically, γ transformation indicates transformation of sRGB (D65) space to L*a*b* (D50) space. Transformation of a color space is implemented by means of the color definition expression of sRGB (D65) space, as well as by means of conversion of a light source from D65 to D50 (any one of various methods; e.g., CIECAM 97s, Vonkries, Bradform, Rlab, ICC, and like methods may be adaptable).

$$X=0.4124 \times sR+0.3576 \times sG+0.1805 \times sB$$

$$Y=0.2126 \times sR+0.7152 \times sG+0.0722 \times sB$$

$$Z=0.0190 \times sR+0.1192 \times sB+0.9505 \times sB$$

$$L^*=116 \times (Y/Yw)^{1/3}-16 (Y/Yw \geq 0.008856)$$

$$L^*=903.29 \times Y/Yw (Y/Yw<0.008856)$$

$$yy=(Y/Yw)^{1/3} (Y/YW \geq 0.008856)$$

$$yy=7.787 \times Y/Yw+16/116 (Y/Yw<0.008856)$$

$$xx=(X/Xw)^{1/3} (X/Xw \geq 0.008856)$$

$$xx=7.787 \times X/Xw+16/116 (X/Xw<0.008856)$$

$$zz=(Z/Zw)^{1/3} (Z/Zw \geq 0.008856)$$

$$zz=7.787 \times Z/Zw+16/116 (Z/Zw<0.008856)$$

$$a^*=500 \times (xx-yy)$$

$$b^*=200 \times (yy-zz)$$

Transformation of color space can be implemented by the above expressions. Here, Xw, Yw, and Zw designate values of a white point.

First, transformation of L*a*b* space to YMCK space requires amendment of the gray scales of the printer engine 12 so as to comply with a desired objective. The TRC·γ correction section 24 corrects the gray scales in an arbitrary manner; for example, such that a gray balance becomes neutral or such that a color difference becomes constant. A color patch is output by way of the TRC·γ correction section 24, thereby preparing a color model of a printer. The color model defines the relationship between values of L*a*b* space and values of YMCK space. Any method; for example, a neural network method, a multiple regression method, or the theoretical expression of Neugebauer, can be employed as an algorithm for preparing a color model.

Figure 2:
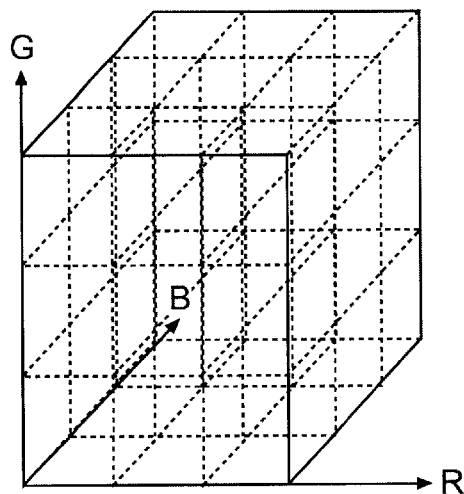
FIG. 2 is a conceptual rendering of a DLUT.

The color transformation section 23 transforms RGB space to YMCK space in accordance with the thus-prepared color model. FIG. 2 is a conceptual rendering of a DLUT (three-dimensional lookup table). As shown in FIG. 2, in a case where a DLUT is used as the color transformation section 23, a table storing data pertaining to YMCK space is prepared for each of three-dimensional discrete address data sets (i.e., R data, G data, and B data pertaining to RGB space). For example, data pertaining to YMCK space are prepared for each of lattice points which are shown in FIG. 2 and correspond to the RGB data. Data pertaining to corresponding YMCK space are determined, through interpolation, from the data pertaining to YMCK space prepared at adjacent lattice points, in accordance with data pertaining to real RGB space. An arbitrary interpolation method may be adapted.

Figure 3:
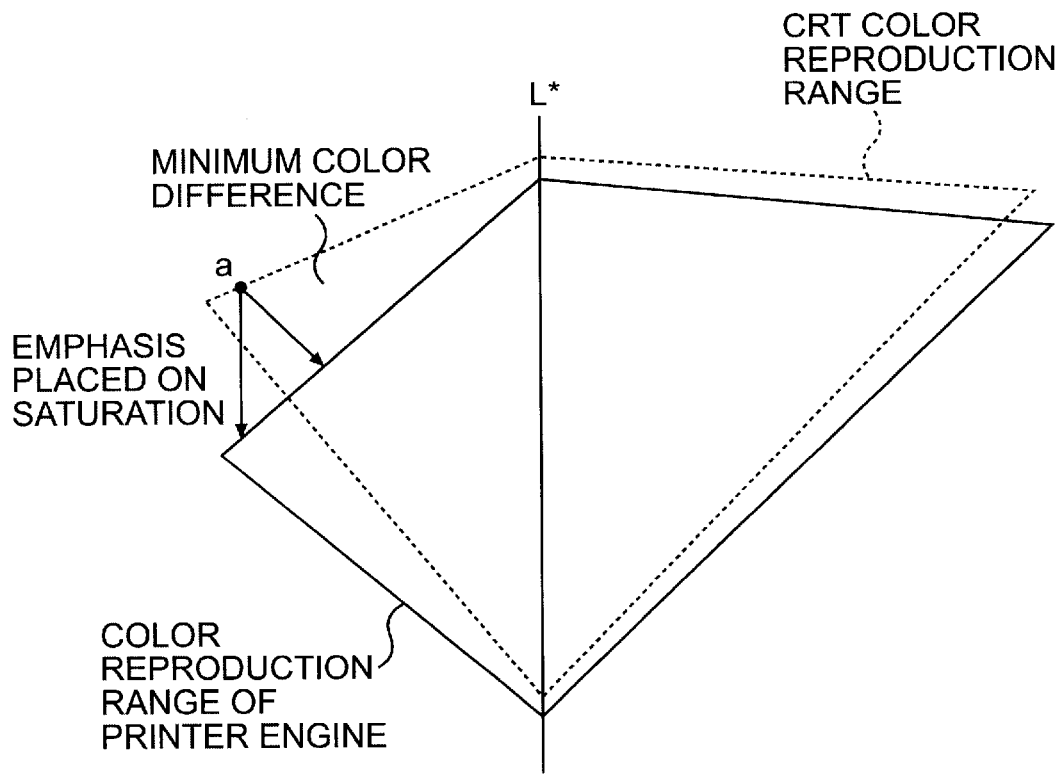
FIG. 3 is a descriptive view showing an example of a color reproduction range.

Values pertaining to YMCK space corresponding to the address data which pertain to RGB space in the DLUT are determined by the above-described color model. At this time, a color range of L*a*b* space defined by sRGB space differs from a reproducible color range of a printer in L*a*b* space. FIG. 3 is a descriptive view showing an example of color reproduction range. In the drawings, broken lines schematically illustrate a color range displayed on, for example, a CRT, and solid lines schematically illustrate a reproducible color range of a printer. In fact, a space is three-dimensional. Here, only one cross-section of the space including the L* axis is illustrated. For example, colors having high degrees of lightness (L*) can be displayed on a CRT. However, some of the colors cannot be reproduced by a printer. For instance, color "a" cannot be reproduced by a printer. Hence, color "a" must be transformed into a color which can be reproduced by the printer. Such transformation of a color reproduction range is called Gamut compression. Saturation of a color is preserved for modulating picture quality for effect (i.e., emphasis is placed on saturation in the drawing), and a color is transformed with a minimum color difference for faithfully reproducing a color.

Transformation of L*a*b* space to YMCK space is not performed in a one-to-one relationship. For instance, the value of K is computed from values of YMC, or the above-described color model is produced while K is taken as a parameter, thus determining an optimum value of K. This processing is called under color removal (UCR). An algorithm optimal for use with a target system in terms of cost and picture quality may be employed as an algorithm for performing UCR operation. FIGS. 4A to 4C are descriptive illustrations showing an example of UCR operation. As shown in FIG. 4A, when values of Y, M, and C have already been determined, those values may be used, as shown in FIG. 4A, unless K is produced. In this case, the amount of UCR is 0%. A black color can be produced by means of mixing Y, M, and C in equal proportions. The maximum value of K (the amount of UCR is 100%) constitutes a portion common to the values of Y, M, and C. As shown in FIG. 4C, K is produced to an amount corresponding to the value of C, where C has the minimum value. Values of the other colors are reduced correspondingly. As a result, the color shown in FIG. 4A is theoretically reproduced by use of K. In this case, the total amount of coloring material can be reduced. As a matter of course, half the value mentioned above may be taken. Hence, FIG. 4B shows an example of color (the amount of UCR is 50%).

Transformation of RGB space to YMCK space determined in the manner as mentioned previously is stored as a parameter in the DLUT, as shown in FIG. 2. The parameter can be used in the color transformation section 23. Color transformation is performed by means of a transformation method, in which the DLUT is used as the color transformation section 23. There may also be employed a masking method using, for example, a 3 by 4 matrix or a 3×10 matrix (the relationship between RGB and YMCK is converted to a matrix expression through regression, and color correction is performed by means of a matrix operation).

The parameters for color transformation (e.g., the parameters stored in the DLUT) which have been determined in the foregoing manner are theoretical values and can be changed according to an objective. For example, in a case where an image is formed on rough paper having poor formation, parameters can be changed so as to increase the density of ink, to thereby fill local voids, which are likely to cause inconsistencies, with coloring material. As has been described in connection with FIG. 4, the amount of UCR is one parameter required for color transformation. For example, in the case of paper of poor formation, the amount of UCR is reduced so as to increase the amount of coloring material such that paper is coated with as much coloring agent as possible, to thereby hide the poor formation of paper and improve picture quality. In the case of paper of good formation, the mount of UCR is increased in order to prevent a drop in picture quality, which would otherwise be caused by an increase in the amount of coloring material. Thus, the total amount of coloring material is reduced, thereby improving picture quality.

Figure 5A:
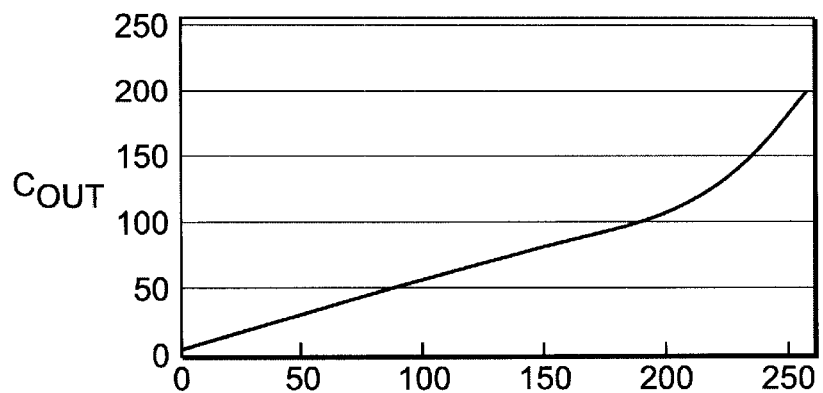
FIGS. 5A through 5C are graphs showing examples of correction curves employed in a TRC·γ correction section.
Figure 5B:
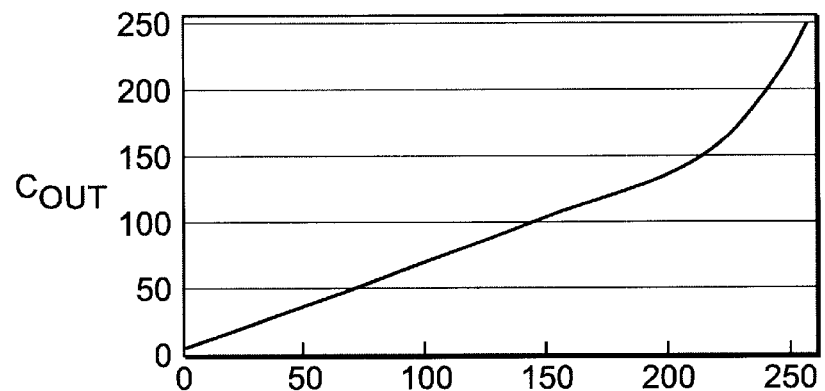
Figure 5C:
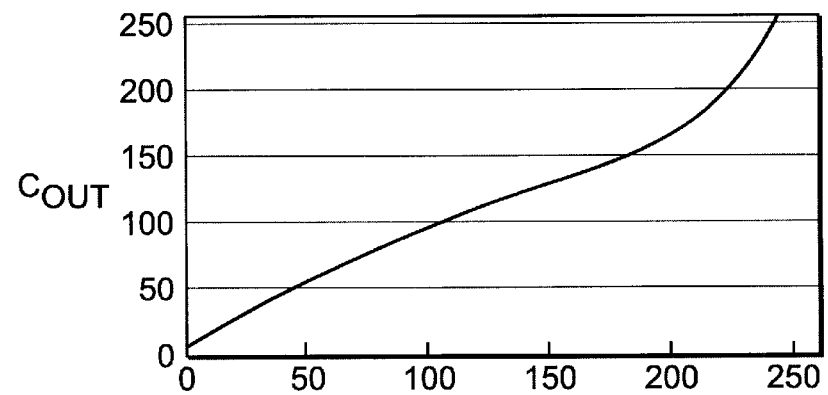

The amount of coloring material required for forming an image can be controlled by means of changing a correction curve through use of the TRC·γ correction section 24. FIGS. 5A to 5C are graphs showing example correction curves pertaining to the TRC·γ correction section 24. In the drawings, the horizontal axis represents the value of an input image signal, and the vertical axis represents the value of an output image signal. In these examples, each of the input and output image signals assumes a value of 0 to 255. Each of FIGS. 5A to 5C illustrates only one correction curve. Correction curves may be provided to, for example, respective color components.

The amount of coloring material increases in the sequence given by the examples shown in FIGS. 5A to 5C. For example, in the case of paper of poor formation, it would be better to select a correction curve shown in FIG. 5C, in which the amount of coloring material increases. As a result, paper is coated with as much coloring material as possible, thereby making the poor formation of paper less visible and improving picture quality. In the case of paper of good formation, it would be better to select a correction curve shown in FIG. 5A, in which the amount of coloring material decreases. Thus, there can be prevented a drop in picture quality, which would otherwise be caused by an increase in the amount of coloring material, thus improving picture quality.

A description will be given of control of parameters performed by the screen processing section 26 of the printer engine section 12 in accordance with formation of paper. As mentioned previously, the screen processing section 26 subjects the image data output from the decomposer 11 to screen processing in accordance with the specified number of screens and a growth pattern. For instance, a dithering sub-matrix method can be used for performing screen processing operation. According to the sub-matrix method, a determination is made as to whether to perform a printing operation by means of a comparison between one pixel of a dithering matrix with one input pixel.

The number of screens can be changed by means of changing the size of the dithering matrix. In FIGS. 6A to 6C, each square corresponds to a single pixel. FIG. 6A shows a case where 100 screens are employed. FIG. 6B shows a case where 150 screens are employed, and FIG. 6C shows a case where 200 screens are employed. The greater the number of screens, the finer an image. Digital noise such as Rosette is difficult to see. However, sensitivity is correspondingly high, and analog noise is likely to arise. Conversely, the smaller the number of screens, the lower the sensitivity, making defects less likely to arise. However, an image is coarse, and digital noise is likely to arise.

In the case of paper of poor formation, inconsistencies are likely to arise in an image, as mentioned previously. Random analog noise, such as inconsistencies, can be made less visible by means of decreasing the number of screens and sensitivity. For example, use of a dithering matrix shown in FIG. 6A makes inconsistencies less visible, thus improving picture quality. In the case of paper of good formation, the number of screens is increased, and use of the dithering matrix shown in FIG. 6C enables formation of a fine and high-quality image.

Inconsistencies can be removed by means of a method of growing screens. FIGS. 7A to 7C illustrate three growth pattern examples. FIG. 7A shows a dot concentration growth pattern, in which pixels located at the center of a matrix are filled first. FIGS. 6A to 6C show the dithering matrix of such dot concentration type. This dot concentration growth pattern is employed popularly. FIG. 7B shows a dot distribution growth pattern. Dot patterns to be grown are located in a distributed manner, and hence an image has superior halftones. This distribution growth pattern is suitable for use with plain paper or woodfree paper having good formation. Rough paper of poor formation yields poor print response, and the distribution growth pattern becomes a remote cause of inconsistencies. FIG. 7C shows a line-type growth pattern. Halftones are expressed by the thickness of a line. The line-type growth pattern is slightly deficient in the characteristic of gradation. However, all pixels are continuous, and hence the line-type growth pattern is superior to the dot concentration growth pattern and the dot distribution growth pattern in terms of print response. Hence, the line-type growth pattern is suitable for use with rough paper of poor formation. Thus, during the screen processing an image optimal for formation of paper can be formed by means of changing a growth pattern so as to comply with the formation of paper.

Control of parameters corresponding to formation of paper to be performed by the printer engine 13 will now be described. First, the configuration of the printer engine 13 will be described, and parameter control performed by individual sections of the printer engine 13 will next be described. The printer engine 13 to be described below assumes an electrophotographic system as an example of an image formation system. As a matter of course, the printer engine 13 is not limited to the electrophotographic system.

Figure 8:
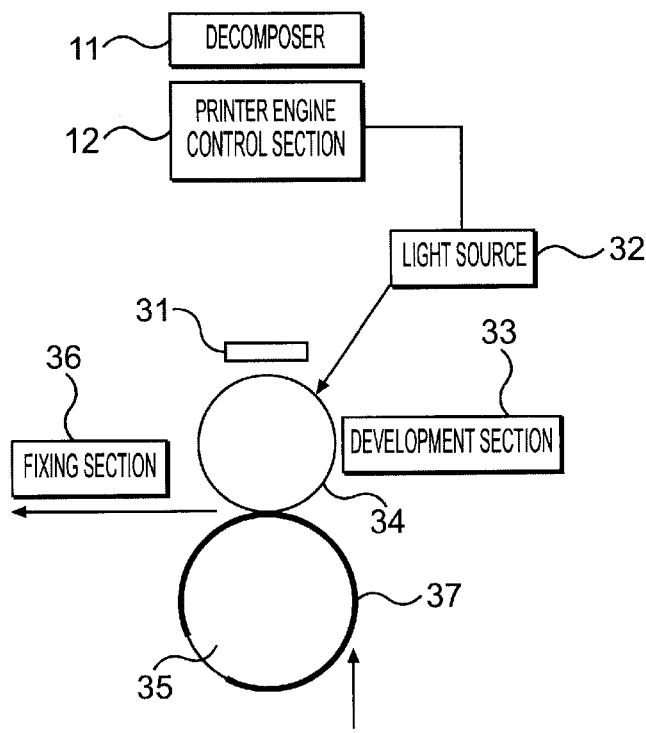
FIG. 8 is a diagram schematically showing a first example of a printer engine.

FIG. 8 schematically shows a first example of the printer engine 13. In the drawing, reference numeral 31 designates an electrification section; 32 designates a light source; 33 designates a development section; 34 designates a photosensitive member; 35 designates a transfer roller; 36 designates a fixing section; and 37 designates paper. In the first example, a color image is formed by means of four rotations of the transfer roller 35.

The photosensitive member 34 is charged to an initial electric potential by means of the electrification section 31. Light is radiated onto the photosensitive member 34 from the light source 32, such as a laser light source, which is activated by a pulse signal output from the pulse signal generation section 27 of the printer engine control section 12. An electrostatic latent image is formed on the photosensitive member 34. Subsequently, toner is supplied to the photosensitive member 34 from the development section 33. The thus-formed electrostatic latent image pattern is developed.

Paper 37 is supplied to the transfer roller 35 by means of an unillustrated paper transfer mechanism, and the paper 37 is retained on the transfer roller 35. At a point where the transfer roller 35 comes in to contact with the photosensitive member 34 and nips the paper 37, toner is transferred from the photosensitive member 34 to the paper 37 by means of electrostatic force. In this way, an image of one color is formed on the paper 37.

Processing pertaining to these steps is repeated once for each of Y, M, C, and K while color of toner to be supplied to the development section 33 is changed. Thus, processing is performed a total number of 4 times. Through four rotations of the roller 35, an image is formed on the paper 37 from four layers of toner.

Subsequently, the paper 37 is removed from the transfer roller 35, and the toner is heated to be melted by the fixing section 36, wherewith the melted toner is fixed on the paper 37. In this way, the paper 37 having a color image formed thereon is output.

Figure 9:
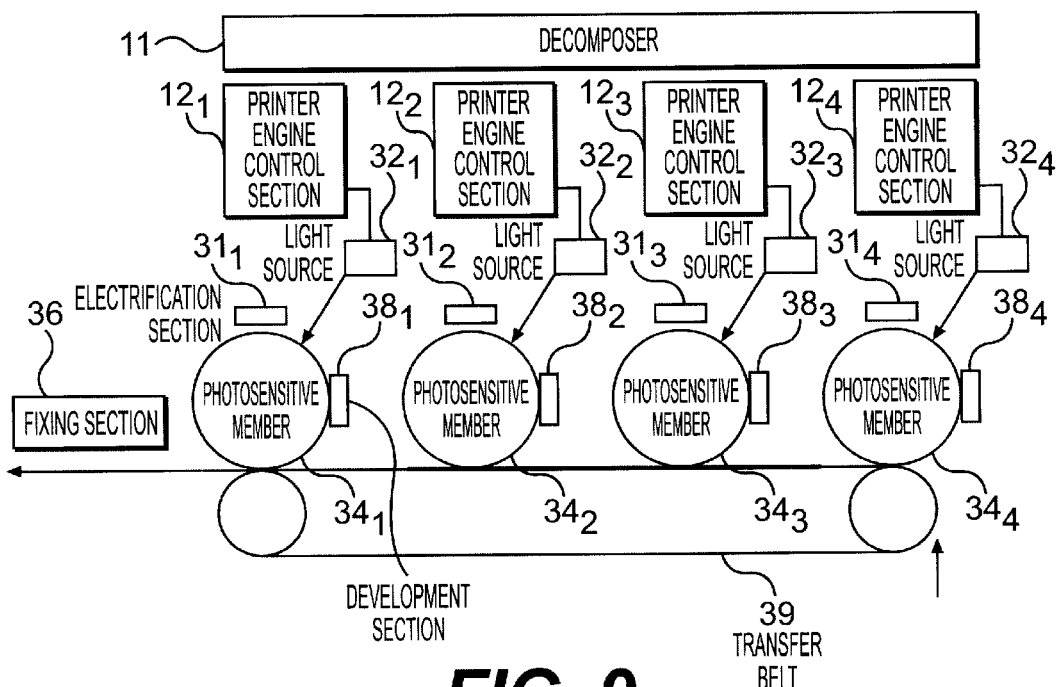
FIG. 9 is a diagram schematically showing a second example of a printer engine.

FIG. 9 schematically shows the construction of a printer engine of a second example. In the drawing, those elements which are the same as those shown in FIG. 8 are assigned the same reference numerals, and repetition of their explanations is omitted. In a case where a plurality of elements of identical construction are disposed in the printer engine, those elements are assigned suffixes. Reference numeral 38 designates a development section, and 39 designates a transfer belt. In the second example, image formation mechanisms are provided in a number equal to the number of colors of toner, thus enabling high-speed formation of a color image. The printer engine of this type is called a tandem printer engine.

In the case of use of toner of four colors; i.e., Y, M, C, and K, four photosensitive members $34_1$ to $34_4$ are assigned to Y, M, C, and K, respectively. Each of the photosensitive members $34_1$ to $34_4$ is accompanied by the electrification section 31, the light source 32, the development section 38, and the printer engine control section 12. Operations required for forming an image from toner of each color on the photosensitive member 34 are the same as those described in connection with the first example. In the present example, each of the development sections $38_1$ to $38_4$ has only toner of a single color, and switching between toner of different colors is not performed.

As the paper 37 is carried over the transfer belt 39 by means of an unillustrated paper transfer mechanism, toner is transferred to the paper at respective points at which the paper 37 comes into contact with and is nipped by the respective photosensitive members 34. In the present example, by means of a single transfer of the paper 37 being performed by the transfer belt 39, an image is formed from toner of four colors on the paper 37. Finally, the fixing section 36 is heated, and toner is melted and fixed on the paper 37.

Figure 10:
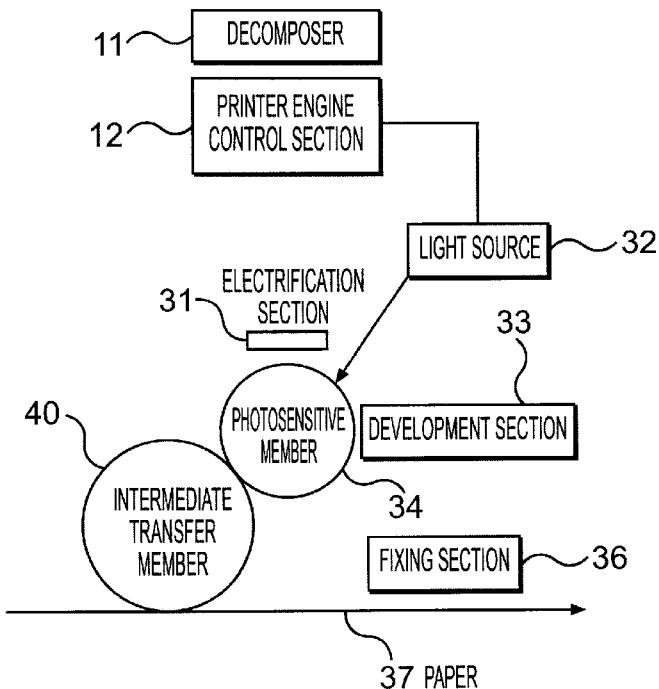
FIG. 10 is a diagram schematically showing a third example of a printer engine.

FIG. 10 schematically shows the construction of a printer engine of a third example. In the drawing, those elements which are the same as those shown in FIG. 8 are assigned the same reference numerals, and repetition of their explanations is omitted. Reference numeral 40 designates an intermediate transfer member. The third example is identical with the first example except that the intermediate transfer member 40 is added as an intermediate image carrier. The intermediate transfer member 40 is formed from material having superior efficiency of acquiring a toner image from the photosensitive member 34 and transferring the toner image from the photosensitive member 34 to the paper 37. As compared with a printer engine which transfers a toner image directly to the paper 37, the printer engine of the present example has improved transfer efficiency.

The toner image formed on the photosensitive member 34 is temporarily transferred to the intermediate transfer member 40. Formation of an image is performed several times while colors of toner supplied from the development section 33 are sequentially changed. By means of rotation of the intermediate transfer member 40, an image is formed on the intermediate transfer member 40 a plurality of times.

An image is formed from toner of the last color on the intermediate transfer 40, and the paper 37 is carried to a point at which the intermediate transfer member 40 comes into contact with and nips the paper 37 in synchronism with rotation of the intermediate transfer member 40. The toner images of many colors formed on the intermediate transfer member 40 are transferred onto the paper 37. The toner is heated and fused by the fixing section 36 and is fixed on the paper 37.

Figure 11:
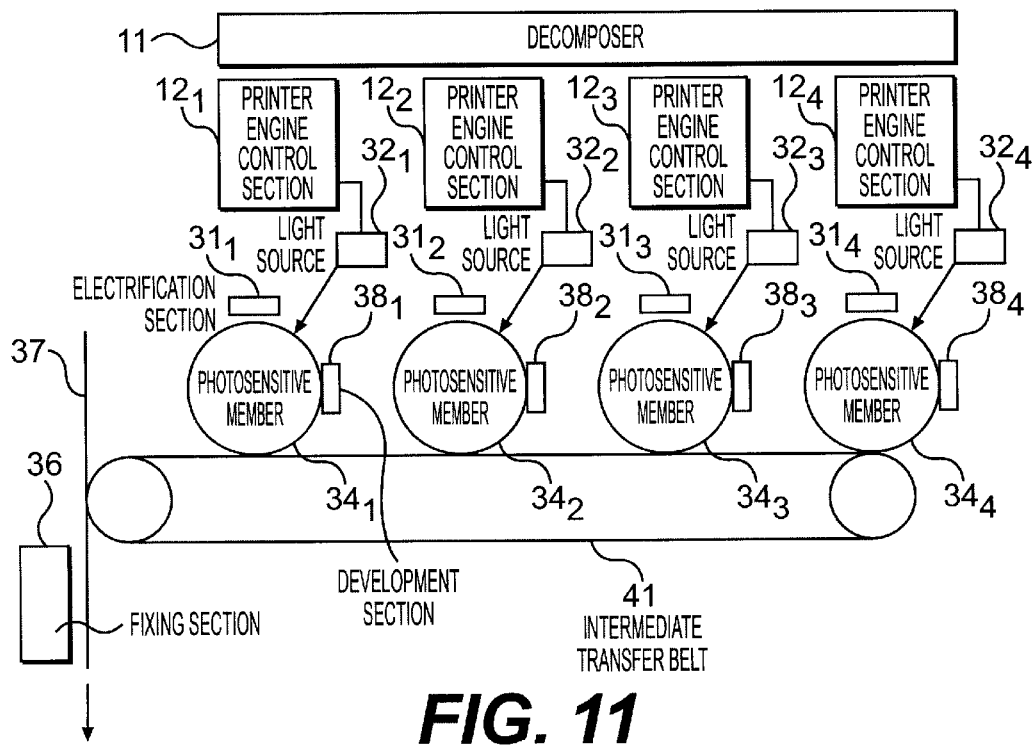
FIG. 11 is a diagram schematically showing a fourth example of a printer engine.

FIG. 11 schematically shows the construction of a fourth example. In the drawing, those elements which are the same as those shown in FIGS. 8 and 9 are assigned the same reference numerals, and repetition of their explanations is omitted. The fourth example is identical with the second example, except that the intermediate transfer member 41 is added as an intermediate image carrier. The intermediate transfer belt 41 operates in the same manner as does the intermediate transfer member 40 in the third example. As compared with a printer engine which transfers a toner image directly to the paper 37, the printer engine has improved transfer efficiency. Since the printer engine is of tandem type, the printer engine can form a color image at high speed.

Toner images of respective colors formed on corresponding photosensitive members 34 are temporarily transferred to the intermediate transfer belt 41. As the intermediate transfer belt 41 rotates, toner images of colors are superimposed on the intermediate transfer belt 41. After toner images of all colors have been formed on the intermediate transfer belt 41, the toner images are transferred onto the paper 37 which has been carried. Finally, the toner images are heated, melted, and fixed on the paper 37 by means of the fixing section 36.

Several printer engines of electrophotograph type have been described as examples of the printer engine 13. By means of the printer engine of such construction, an image can be formed in accordance with formation of paper by means of controlling parameters. Parameter control to be performed in the individual sections of the printer engine will now be described.

Figure 12:
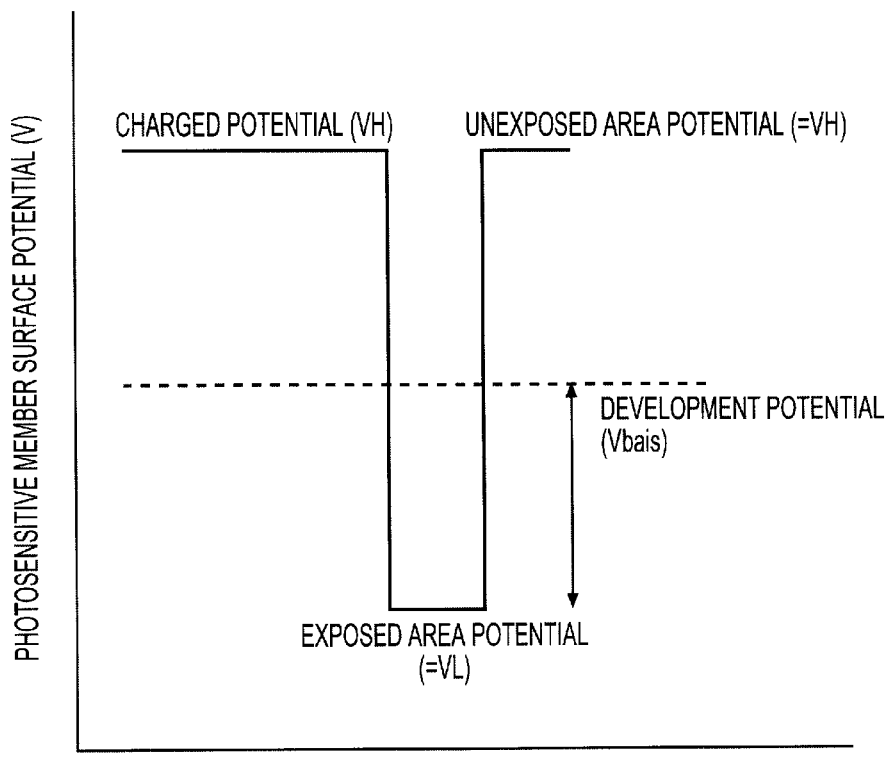
FIG. 12 is a graph showing an example of surface potential of a photosensitive member.

Control of an electrification section, an exposure section, and a development section will be described. A common feature among the first through fourth examples of the printer engine 13 is that the printer engine is provided with the electrification section 31, the light source 32, and the development section 33, as well as the photosensitive member 34. In the second and fourth examples, the printer engine is provided with a plurality of units, each unit comprising the development section 31, the light source 32, and the development section 33, and the photosensitive member 34. FIG. 12 is a chart for describing an example of surface potential of the photosensitive member. In the drawing, VH denotes a charged potential of the photosensitive member 34 when the photosensitive member 34 is charged by the electrification section 31. VL denotes the electric potential of the area of the photosensitive member 34 exposed by the light originating from the light source 32. Vbias denotes a development potential. These voltages are adjustable. For example, the charged potential VH can be adjusted by means of a voltage supplied to the electrification section 31. The potential VL of the exposed section can be adjusted by means of the amount of energy supplied from the light source 32. Further, the development potential Vbias can be adjusted by means of a voltage supplied to the development section 33. By means of a balance between the charged potential VH, the potential VL of the exposed area, and the development potential Vbias, an electrostatic balance between the electrostatic energy remaining on the photosensitive member 34 and the development potential can be adjusted. As a result, the amount of toner supplied to the exposed area (image area) on the photosensitive member 34 is controlled.

As mentioned above, in the case of paper of poor formation, the formation of paper can be hidden by means of supplying a larger amount of toner, thereby preventing occurrence of inconsistencies. The amount of toner supplied from the development section 33 can be increased by means of controlling the charged potential VH, the potential VL of an exposed area, and the development potential Vbias. Conversely, in the case of paper of good formation, the amount of toner to be supplied is controlled in an optimal manner so as to form an image of best quality, by means of controlling the charged potential VH, the potential VL of an exposed area, and the development potential Vbias.

Figure 13:
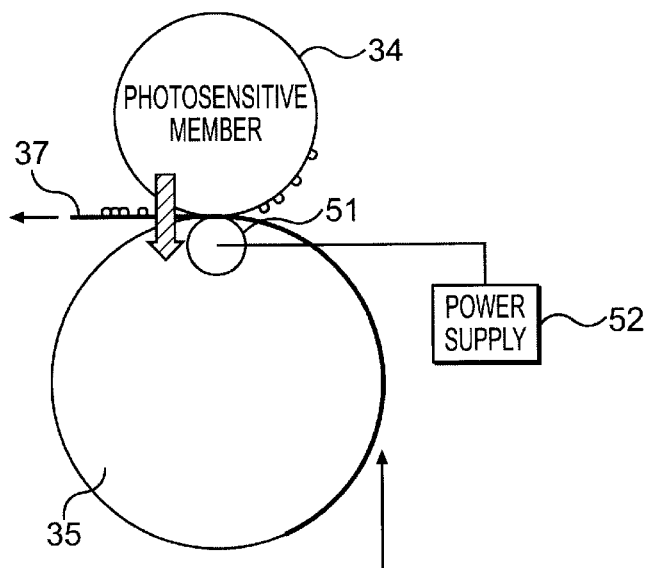
FIG. 13 is an illustration for describing an example of a transfer section of the printer engine of the first example.

Control operation to be performed by the transfer section will now be described. FIG. 13 is an illustration for describing an example of a transfer section provided in the printer engine of the first example. Reference numeral 51 designates a transfer member; and 52 designates a power supply. As has been described in connection with FIG. 8, a toner image formed on the photosensitive member 34 is transferred to the paper 37 carried by the transfer roller 35, by means of electrostatic force supplied from the transfer member 51. The efficiency of transfer operation is controlled by means of the material of the transfer roller 35 and the voltage and current supplied to the transfer member 51 from the power supply 52.

At the time of transfer of a toner image to the paper 37 of good formation, the only requirement is that the optimum voltage and current be supplied to the transfer member 51 from the power supply 52. In a case where the paper 37 has poor formation, the only requirement is that the voltage and current supplied to the transfer member 51 from the power supply 52 be controlled so as to increase the amount of toner to be transferred.

A transfer section of the printer engine 13 of the second example is in principle identical with that shown in FIG. 13. Explanation of the transfer section is omitted. The printer engine 13 of the second example is of tandem type. Hence, transfer of toner images is performed a plurality of times by means of a plurality of transfer members. Therefore, the voltage and current supplied to the transfer members assigned to respective colors can be controlled from one transfer member to another transfer member.

Figure 14:
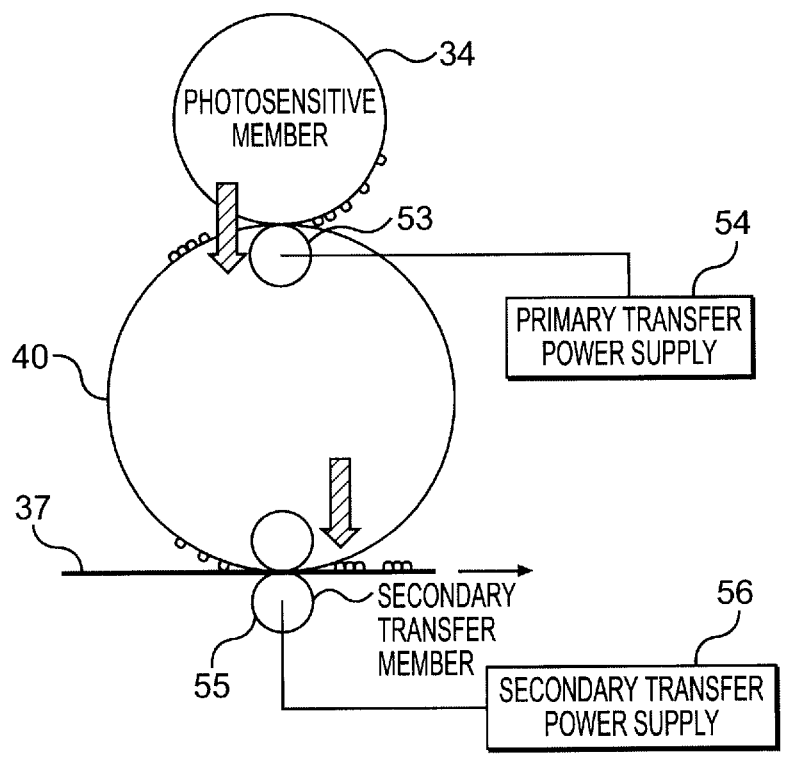
FIG. 14 is an illustration for describing an example of a transfer section of the printer engine of the third example.

FIG. 14 is an illustration for describing one example of a transfer section provided in the printer engine 13 of the third example. In the drawing, reference numeral 53 designates a primary transfer member; 54 designates a primary transfer power supply; 55 designates a secondary transfer member; and 56 designates a secondary transfer power supply. As has been described in connection with FIG. 10, the printer engine 13 of the third example involves a primary transfer process for temporarily transferring a toner image formed on the photosensitive member 34 to the intermediate transfer member 40 and a secondary transfer process for transferring the image from the intermediate transfer member 40 to the paper 37. The efficiency of the transfer operation performed in the primary transfer process is controlled by means of the voltage and current supplied from the primary transfer power supply 54 to the primary transfer member 53. The efficiency of the transfer operation performed in the secondary transfer process is controlled by means of the voltage and current supplied from the secondary transfer power supply 56 to the secondary transfer member 55.

Particularly, in a case where control of transfer operation is performed in accordance with the formation of the paper 37, a control operation to be performed in the secondary transfer process—in which an image is transferred from the intermediate transfer member 40 to the paper 37—is predominant. In a case where a toner image is transferred to the paper 37 of good formation, the only requirement is that an optimum voltage and current be supplied to the secondary transfer member 55 from the secondary transfer power supply 56. In the case of the paper 37 of poor formation, the voltage and current supplied to the secondary transfer member 55 from the secondary transfer power supply 56 is controlled so as to transfer a larger amount of toner from the intermediate transfer member 40.

A transfer section of the printer engine 13 of the second example is in principle identical with that shown in FIG. 14. The transfer section performs processing pertaining to the primary transfer process a plurality of times and processing pertaining to the secondary transfer process one time. Processing pertaining to the secondary transfer process is predominant in control of transfer operation according to the formation of the paper 37. As in the case of the transfer section shown in FIG. 14, the only requirement is that the voltage and current supplied from the secondary transfer power supply 56 to the secondary transfer member 55 be controlled in accordance with formation of paper.

Figure 15:
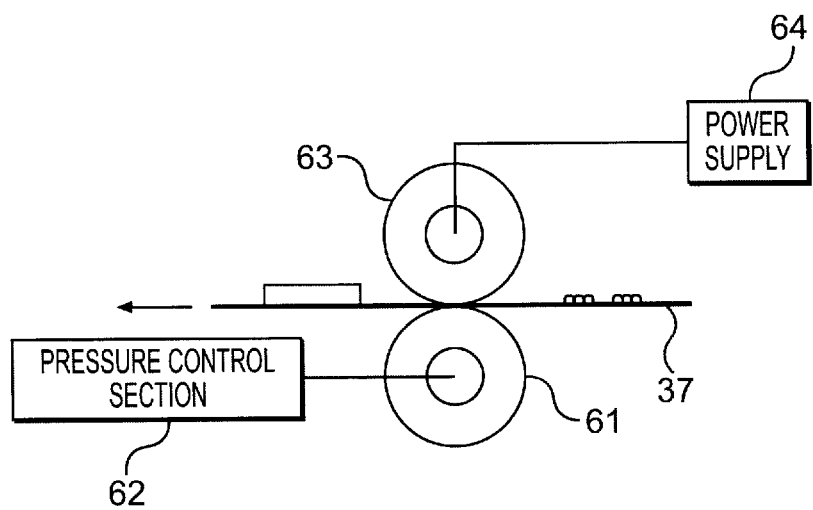
FIG. 15 is an illustration for describing an example of a fixing section.

Control operation to be performed by the fixing section will now be described. FIG. 15 is an illustration for describing an example of the fixing section. In the drawing, reference numeral 61 designates a press roller; 62 designates a pressure control section; 63 designates a heating roller; and 64 designates a power supply for heating purpose. The fixing section 36 has the press roller 61 and the heating roller 63. The press roller 61 mechanically presses the paper 37 along with the heating roller 63. The pressing force is adjusted by means of a control operation performed by the pressure control section 62. The heating roller 63 generates heat from the power supplied from the power supply 64, thereby heating and melting the toner on the paper 37. The fixing temperature of the heating roller 63 can be controlled by means of controlling the power supplied from the power supply 64. The fixing performance of the fixing section is controlled by means of these controlling operations, thus preventing occurrence of an offset phenomenon (i.e., incomplete fixing of toner or unmelted toner). An offset phenomenon arises within a certain latitude (i.e., the upper and lower limits). The temperature of the heating roller and the pressure to be applied by the press roller can be changed within the latitude.

In a case where toner is fixed on the paper 37 of good formation, the power supply 64 is controlled so as to maintain the temperature of the heating roller 63 at an optimal temperature. Another requirement is that the pressure control section 62 be controlled such that pressing force to be applied by the press roller 61 becomes optimum. In the case where the paper 37 is of poor formation, the power supply 64 is controlled so as to lower the temperature of the heating roller 63. As a result, the gloss of the entire image is reduced, whereby the range of a difference in gloss is reduced. Consequently, local inconsistencies in gloss can be eliminated. The pressure control section 62 is controlled such that the pressing force to be applied by the press roller 61 becomes stronger. Fixing of toner is promoted by means of a mechanical pressing force, thereby reducing inconsistencies.

The amount of heat applied to the toner on the paper 37 can be controlled by means of controlling a fixing speed. In this case, it would be better to construct the fixing section such that the process speed of the entire printer engine is controlled or such that only the fixing speed of the fixing section 36 is controlled by means of providing a space in front of the fixing section 36.

Control of parameters to be performed by the individual sections of the printer engine according to the formation of paper has been described. When parameters are controlled by the individual sections in the manner as mentioned above, pieces of paper are classified into categories. Parameters are set so as to comply with each of the categories, thereby enabling formation of an image. A formation index indicating the formation of paper can be used for classifying paper into categories. More specifically, paper is exposed to light of, for example, 500×200 dots, thereby allowing light to pass through paper and measuring the levels of a gray scale. A histogram is prepared from the thus-measured levels of the gray scale. A formation index (FI) can be computed by the following expression.

FI (formation index)=peak value (degrees)÷(the number of classes of 100 degrees or more×100)

On the basis of the thus-computed formation index FI, categories can be set as follows:

A: Rough paper having an FI of 10 or less (foreign-made plain paper, low-end paper, or the like paper)

B: Paper having the FI ranging from 10 to 20 (domestically-produced-and-circulated plain paper, paper for B/W, or the like)

C: Paper having an FI of 20 or more (paper specialized for color printing)

Paper may be arbitrarily classified into more detailed categories, or the range of FI assigned to each of the categories may be changed arbitrarily.

In the image forming apparatus shown in FIG. 1, the user can determine a category into which paper for image formation is to be classified, by way of the operation section 15. Alternatively, the user may remotely determine a category by means of an external computer and by way of the interface section 16. The image forming apparatus is further provided with a translucent optical sensor for measuring the formation of paper. The formation index is directly computed from the result of measurement of halftone of transmitted light through use of the sensor. Paper may be classified into categories. In many cases, a printer outputs a setup check pattern at the time of production of a first printout. Formation of paper can be detected during the production of a first printout.

FIG. 16 is a table showing a specific example of categories based on formation of paper and parameter settings assigned to the respective categories. FIG. 17 is a table showing an example of effects on picture quality exerted when parameters are controlled, and an example of effects on picture quality exerted when no parameter control is performed. For example, parameters of the individual sections can be set for each category in accordance with the formation of paper, as shown in FIG. 16. As mentioned above, in a case where an image is formed on paper of poor formation falling in category A, the amount of coloring material is increased by means of reducing the amount of UCR and increasing the value of TRC-γ of the TRC-γ correction section 24. Further, the number of screens is reduced to 70 to 110 screens in areas other than those occupied by text, thereby lowering sensitivity and making inconsistencies less visible. Further, the fixing temperature is reduced, there by eliminating inconsistencies in gloss. Thus, changing of parameters involves disadvantages. However, inconsistencies due to poor formation of paper are diminished, thereby improving the picture quality of an entire image. In a case where an image is formed on paper of good formation classified into category C, the only requirement is that parameters of individual sections be set such that an image of best picture quality is formed. The parameters shown in FIG. 16 are portions of examples. Parameters which are not described in FIG. 16 may be controlled. Further, values of the parameters shown in FIG. 16 can be set arbitrarily.

FIG. 17 shows results of comparison between picture quality obtained when parameters were changed for each category in accordance with formation of paper, and picture quality obtained when parameters were not changed. In a case where parameters were not changed in accordance with formation of paper, picture quality of an image formed on the paper classified as category A was significantly deteriorated. Even in a case where an image was formed on the paper classified as category B, standard or lower picture quality was obtained. In a case where parameters were changed for each of the categories in accordance with the formation of paper in the manner as described in connection with FIG. 16, standard picture quality was attained through use of the paper classified as category A. Further, standard or higher picture quality was attained through use of the paper classified as category B. Thus, so long as parameters of the individual sections are controlled in accordance with formation of paper, an image of somewhat favorable quality can be formed on paper of poor formation. As a matter of course, no deterioration arises in the picture quality of an image formed on paper of good formation.

(SECOND EMBODIMENT)

Figure 18:
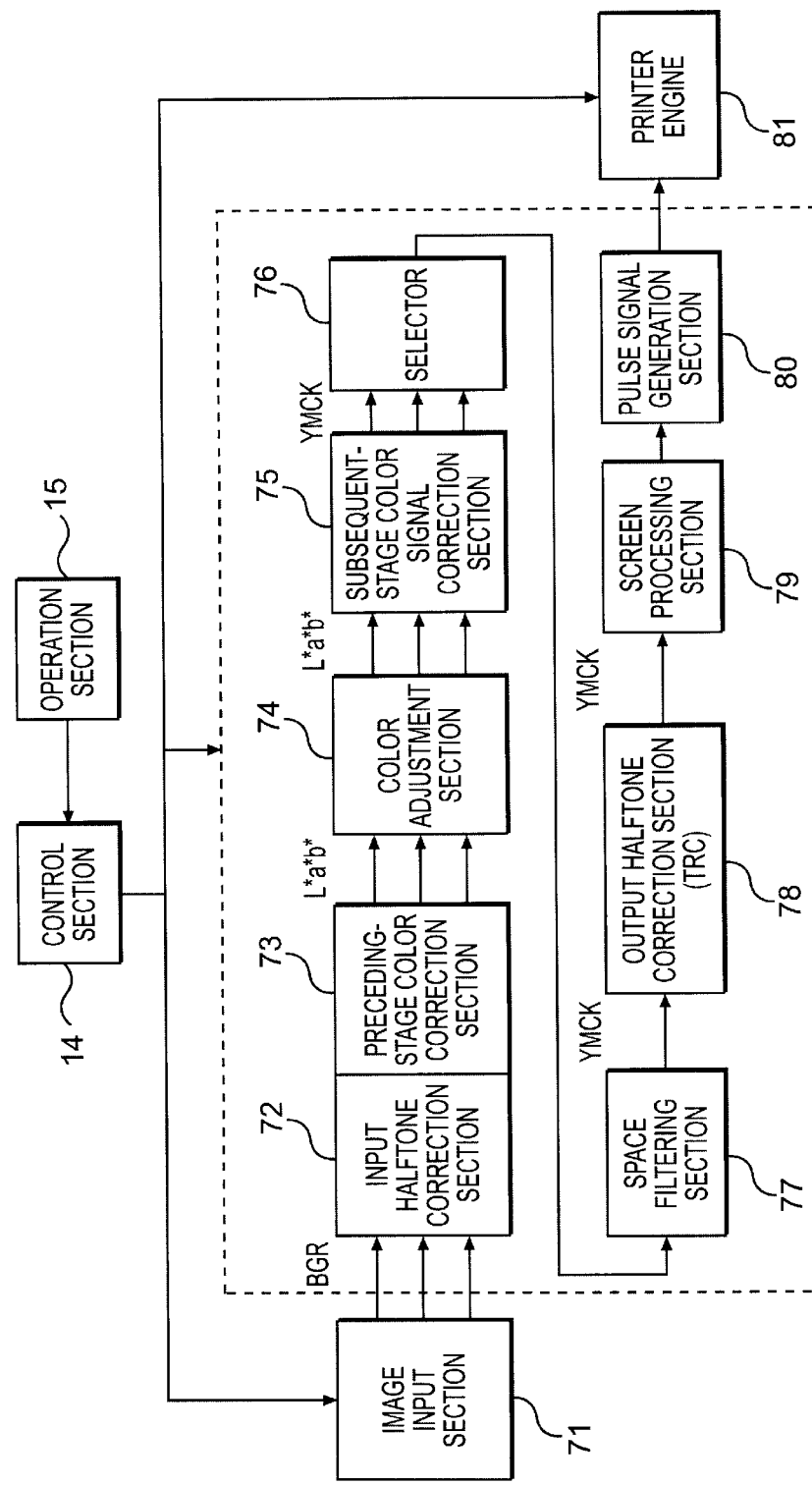
FIG. 18 is a block diagram showing an image forming apparatus according to another embodiment of the present invention.

FIG. 18 is a block diagram showing an image forming apparatus according to a second embodiment of the present invention. In the drawing, reference numeral 71 designates an image input section; 72 designates an input halftone correction section; 73 designates a preceding-stage color signal correction section; 74 designates a color adjustment section; 75 designates a subsequent-stage color signal correction section; 76 designates a selector; 77 designates a space filtering section; 78 designates an output halftone correction section; 79 designates a screen processing section; 80 designates a pulse signal generation section; and 81 designates a printer engine. The example shown in FIG. 1 shows the image forming apparatus in which data pertaining to an image to be formed are received as drawing data described in PDL format by the image forming apparatus from an external computer, and an image is formed by means of a drawing operation. The example shown in FIG. 18 shows the configuration of an image forming apparatus in which the image read from an image input section 71 is formed on paper.

The image input section 71 is formed from an image input device; for example, a scanner. In the present embodiment, an image is output as a signal of RGB space. The image signal is dependent on the characteristics of the image input section 71, and hence the signal must be transformed into an image signal complying with the characteristic of the printer engine 81. Color transformation can be implemented by either a single-stage method for transforming RGB space directly into, for example, YMCK space, or a two-stage method for temporarily transforming RGB space into a uniform color space, such as L*a*b* space, and then transforming the uniform color space into a color space corresponding to the printer engine 81, such as YMCK space. The image forming apparatus illustrated in the present embodiment has a construction for performing color transformation according to a two-stage method. As a matter of course, color transformation may be performed according to a single-stage method.

The input halftone correction section 72 causes the image input section 71 to perform halftone correction operation, such as γ correction operation. The input halftone correction section 72 can be constituted of, for example, a one-dimensional LUT. The preceding stage correction section 73 transforms an image signal of RGB space into an image signal of L*a*b* space. Color correction parameters to be used by the input halftone correction section 72 and the preceding color signal correction section 73 can be determined as follows. First, the image input section 71 reads a single color patch, and the one-dimensional LUT of the input halftone correction section 72 is determined such that the RGB value of the patch assumes gray in a well-balanced manner. The thus-determined patch is read from the image input section 71 by way of the input halftone correction section 72. A value of colorimetry of the patch (L*a*b* value) and the read value of the patch (RGB value) are prepared as a scanner mode, regardless of an algorithm for preparing the model. A coefficient of the preceding-stage color signal correction section 73 is determined from the scanner model.

Through parameters are basically stored in the color adjustment section 74. The user can adjust hue rotation and density through use of the color adjustment section 74, as required. In accordance with an instruction entered by the user by way of the operation section 15, arbitrary parameters can be set. An arbitrary method can be employed for adjusting a color. For instance, there may be employed a matrix operation method using a parameter matrix.

The subsequent-stage color signal correction section 75 transforms an image signal of L*a*b* space into, for example, an image signal of YMCK space to be used by the printer engine section 81. The subsequent-stage color signal correction section 75 can be constituted of a DLUT, as is the color transformation section 23 shown in FIG. 1. The DLUT of the color transformation section 23 differs from that of the subsequent-stage color signal correction section 75 only in that an image signal of L*a*b* space is input. Hence, parameters of the DLUT of the subsequent-stage color signal correction section 75 can be set in the same manner as that in which parameters of the DLUT of the color transformation section 23 are set.

The selector 76 selects only one component from an image signal of YMCK space output from the subsequent-stage color signal correction section 75, and outputs the thus-selected component. The printer engine 81 is intended to implement a printer engine which repeatedly performs an image formation operation, such as that shown in FIG. 8 or 10, a plurality of times. A component is selected from an image signal in accordance with an image formation operation which is to be performed each time. In a case where there is employed a printer engine of tandem type such as that shown in FIG. 9 or 11, the selector 76 is not provided, and elements which will be described below are provided for each of Y, M, C, and K color components.

The space filtering section 77 adjusts sharpness. The space filtering section 77 has a 3 by 3 matrix parameter, a 5 by 5 matrix parameter, or a 5 by 7 matrix parameter. The space filtering section 77 determines the value of a pixel of interest by means of a convolution operation through use of the value of the pixel of interest and the values of surrounding pixels.

The output halftone correction section 78, the screen processing section 79, and the pulse signal generation section 80 are identical with the TRC-γ correction section 24, the screen processing section 26, and the pulse signal generation section 27, which are shown in FIG. 1. Repeated explanation of these elements is omitted here. The printer engine 18 is identical with the printer engine 13 shown in FIG. 1. For instance, in the case of a printer engine of electrophotography type, the printer engine can be formed so as to assume the same construction as that shown in any one of FIGS. 8 through 11. As a matter of course, a printer engine of another image formation type may be employed.

The image forming apparatus controls parameters in accordance with formation of paper. In the event of paper of poor formation, inconsistencies are prevented, enabling an improvement in picture quality. For instance, parameters of the subsequent-stage color signal correction section 75, those of the output halftone correction section 78, those of the screen processing section 79, and those of the printer engine 81 can be controlled in the same manner as mentioned in the embodiments.

FIGS. 19A through 20C are illustrations for describing an example of filtering characteristic of the space filtering section 77. In a case where a 3 by 3 matrix is used as a space filter, the space filter acts as a smoothing filter by means of use of, for example, matrix parameters shown in FIG. 19B. As shown in FIG. 19A, a filtering operation is performed such that low-spatial-frequency components increase. As a result, an image signal having a waveform on the left side of FIG. 19C assumes a waveform shown on the right side of FIG. 19C, thus increasing the degree of fading of an image.

Through use of the matrix parameter shown in FIG. 20B, the space filter acts as an enhancement filter. As shown in FIG. 20A, the an image signal is processed such that spatial-frequency components are increased. As a result, an image signal having a waveform shown on the left side of FIG. 20C forms an image having increased sharpness, as indicated by the waveform on the right side of FIG. 20C.

In order to improve picture quality, an image signal is usually subjected to enhancing filtering operation. In a case where paper has good formation, the only requirement is that an image signal be subjected to enhancement filtering operation such as that shown in FIG. 20. In a case where paper has poor formation, an image signal is subjected to a smoothing filter such as that shown in FIGS. 19A to 19C, from the viewpoint of minimizing inconsistencies. As a result, the image signal becomes drooped, thus losing gloss. Consequently, inconsistencies can be eliminated from an image.

In this way, an image complying with formation of paper can be formed by means of controlling filter parameters of the space filtering section 77. Here, the filter parameters shown in FIGS. 19 and 20 are examples, and the filter parameters shall not be limited to these examples. The filter is not limited to a size of 3×3. Parameters for changing the filter size so as to comply with formation of paper can be employed.

The foregoing embodiments show example constructions of the printer and the copier and have described control of parameters in accordance with formation of paper. However, the present invention is not limited to these applications. The present invention can be applied to various devices, such as a color facsimile, a color multifunction apparatus, and other applications involving formation of an image.

As has been described above, the present invention enables formation of an image by means of controlling parameters in accordance with formation of paper. Thus, the present invention yields an advantage of the ability to prevent occurrence of inconsistencies in paper of poor formation, thereby improving picture quality. Since the image forming apparatus controls only parameters, an improvement in picture quality can be attained without involvement of an increase in costs of an image forming apparatus.

What is claimed is:

1. An image forming apparatus comprising:
   an image formation section adapted to enable setting of various parameters and forming an image in accordance with the parameters; and
   a controller adapted to form an image on paper by means of setting the parameters in said image formation section to reduce inconsistencies appearing on the image due to formation of the paper.

2. The image forming apparatus according to claim 1, wherein said image formation section includes a color correction section adapted to correct a color according to a color correction parameter, and said controller sets the color correction parameter in accordance with the formation of the paper.

3. The image forming apparatus according to claim 1 or 2, wherein said image formation section forms an image through use of a plurality of coloring materials including a black coloring material and has the function of adjusting the amount of black coloring material according to a black coloring parameter, and said controller adjusts the black coloring parameter for adjusting the amount of the black coloring material according to the formation of the paper.

4. The image forming apparatus according to claim 1, wherein said image formation section includes a spatial filtering section adapted to subject an image to spatial filtering operation in accordance with a spatial filtering parameter, and said controller sets the spatial filtering parameter for the spatial filtering operation in accordance with the formation of paper.

5. The image forming apparatus according to claim 1, wherein said image formation section includes a correction section adapted to subject an image to γ correction in accordance with a γ correction operation parameter, and said controller sets the γ correction operation parameter for the γ correction in accordance with the formation of paper.

6. The image forming apparatus according to claim 1, wherein said image formation section includes a screen section adapted to perform a screen operation in accordance with the number of screens corresponding to a screen processing parameter, and said controller sets the screen processing parameter for instructing the number of screens in accordance with the formation of paper.

7. The image forming apparatus according to claim 1, wherein said image formation section includes a screen section adapted to perform a screen operation in accordance with a growth pattern corresponding to a growth pattern parameter, and said controller sets the growth pattern parameter for instructing the growth pattern in accordance with the formation of paper.

8. The image forming apparatus according to claim 1, wherein said image formation section is constructed so as to adjust a voltage to be used for electrification in accordance with an electrification parameter and includes an image formation engine which electrifies a photosensitive member, forms a latent image by exposing the photosensitive member in accordance with an image to be formed, and develops the latent image; and
   wherein said controller sets the electrification parameter for adjusting the voltage for electrification in accordance with the formation of paper.

9. The image forming apparatus according to claim 1, wherein said image formation section is constructed so as to adjust a voltage to be used for exposure in accordance with an exposure parameter and includes an image formation engine which electrifies a photosensitive member, forms a latent image by exposing the photosensitive member in accordance with an image to be formed, and develops the latent image; and said controller sets the exposure parameter for adjusting the voltage for exposure in accordance with the formation of paper.

10. The image forming apparatus according to claim 1, wherein said image formation section is constructed so as to adjust a voltage to be used for development in accordance with a development parameter and includes an image formation engine which electrifies a photosensitive member, forms a latent image by means for exposing the photosensitive member in accordance with an image to be formed, and develops the latent image; and said controller sets the development parameter for adjusting the voltage for development in accordance with the formation of paper.

11. The image forming apparatus according to claim 1, wherein said image formation section has an image formation engine for transferring an image formed on an image carrier onto paper and is constructed so as to adjust a voltage or current for transfer in accordance with a transfer parameter;

wherein said controller sets the transfer parameter for adjusting the voltage or current for transfer in accordance with the formation of paper.

12. The image forming apparatus according to claim 1, wherein said image formation section has an image formation engine for fixing an image formed on an image carrier onto paper and is constructed so as to adjust a fixing temperature in accordance with a fixing temperature parameter; and wherein said controller sets the fixing temperature parameter for adjusting the fixing temperature in accordance with the formation of paper.

13. The image forming apparatus according to claim 1, wherein said image formation section has an image formation engine for fixing an image formed on an image carrier onto paper and is constructed so as to adjust a fixing pressure in accordance with a fixing pressure parameter; and wherein said controller sets the fixing pressure parameter for adjusting the fixing pressure in accordance with the formation of paper.

14. The image forming apparatus according to claim 1, further comprising an operation section adapted to enable a user to effect settings pertaining to formation of paper; and wherein said controller sets a parameter on said image formation section in accordance with the settings pertaining to formation of paper effected by said operation section.

15. The image forming apparatus according to claim 1, further comprising an external interface section adapted to exchange information with the outside; and wherein said controller sets a parameter on said image formation section in accordance with the settings pertaining to formation of paper received by way of the external interface section.

16. The image forming apparatus according to claim 1, further comprising a sensor adapted to detect information about formation of paper, and wherein said controller sets a parameter on the image formation section in accordance with the settings pertaining to the formation of paper detected by said sensor.

17. The image forming apparatus according to claim 1, wherein the formation of the paper is represented by formation index (FI); and wherein the FI is defined by the following expression FI=peak value (degree)/(number of classes of 100 degrees×100)

where the peak value and the number of classes of 100 degrees are obtained from measurement of levels of gray scale when light is applied to the paper and is passed through the paper.

18. An image forming apparatus comprising:

an image formation section adapted to enable setting of various parameters and forming an image on paper;

a setting section adapted to set formation information of the paper indicating formation of the paper in several stages; and a controller adapted to set the parameters on the image formation section on the basis of the formation information of the paper set by said setting section to reduce inconsistencies appearing on the image due to formation of the paper.

19. The image forming apparatus according to claim 18, wherein the formation information of the paper includes formation information of plain paper.

20. The image forming apparatus according to claim 18, wherein the formation information of the paper which is set by said setting section is a predetermined, fixed value.

21. The image forming apparatus according to claim 18, wherein said controller has a storage section adapted to store the formation information set by said setting section and parameters of said controller so as to correspond to each other.

22. The image forming apparatus according to claim 18, wherein said image formation section has an image formation engine constructed so as to adjust a fixing temperature according to a fixing temperature adjustment parameter, and said controller sets the fixing temperature lower as the formation of the paper becomes poorer.

23. An image forming apparatus comprising:

an image formation section adapted to enable setting of various parameters and forming an image in accordance with the parameters, wherein the image formation section includes (a) a correction section adapted to subject the image to γ correction, and (b) a screen section adapted to subject the image to screen processing in accordance with a number of screens and a growth pattern; and a controller adapted to set the parameters for the γ correction in the correction section and for the number of screens and the growth pattern in the screen section in accordance with formation of the paper.

24. An image forming apparatus comprising:

an image formation section adapted to enable setting of various parameters and forming an image on paper, wherein the image formation section includes (a) a correction section adapted to subject an image to γ correction, and (b) a screen section adapted to subject an image to screen processing in accordance with a number of screens and a growth pattern;

a setting section adapted to set formation information of the paper indicating the formation of the paper in several stages; and a controller adapted to set the parameters for the γ correction in the correction section and for the number of screens and the growth pattern in the screen section on the basis of the formation information of paper set by said setting section.

* * * * *